United States Patent
Kim et al.

(10) Patent No.: US 9,432,885 B2
(45) Date of Patent: Aug. 30, 2016

(54) METHOD AND APPARATUS FOR PACKET-SWITCHED SERVICE HANDOVER IN WIRELESS COMMUNICATION SYSTEM

(71) Applicant: LG ELECTRONICS INC., Seoul (KR)

(72) Inventors: Taehyeon Kim, Anyang-si (KR); Laeyoung Kim, Anyang-si (KR); Jaehyun Kim, Anyang-si (KR); Hyunsook Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/391,355

(22) PCT Filed: Apr. 12, 2013

(86) PCT No.: PCT/KR2013/003065
§ 371 (c)(1),
(2) Date: Nov. 3, 2014

(87) PCT Pub. No.: WO2013/154375
PCT Pub. Date: Oct. 17, 2013

(65) Prior Publication Data
US 2015/0117406 A1    Apr. 30, 2015

Related U.S. Application Data

(60) Provisional application No. 61/623,069, filed on Apr. 12, 2012, provisional application No. 61/682,778, filed on Aug. 14, 2012.

(51) Int. Cl.
*H04W 36/22* (2009.01)
*H04W 36/00* (2009.01)
*H04W 36/14* (2009.01)

(52) U.S. Cl.
CPC ......... *H04W 36/0022* (2013.01); *H04W 36/14* (2013.01)

(58) Field of Classification Search
CPC .............................. H04W 36/22; H04W 36/14
See application file for complete search history.

(56) References Cited

U.S. PATENT DOCUMENTS

| | | |
|---|---|---|
| 8,787,318 B2* | 7/2014 | Pampu .......................... 370/331 |
| 2010/0113024 A1* | 5/2010 | Wu ........................ H04W 36/14 455/436 |

(Continued)

OTHER PUBLICATIONS

Qualcomm Inc., "A 3G/LTE Wi-Fi Offload Framework: Connectivity Engine (CnE) to Manage Inter-System Radio Connections and Applications," Jun. 2011, 15 pages.

(Continued)

*Primary Examiner* — Ajay Cattungal
(74) *Attorney, Agent, or Firm* — Lee Hong Degerman Kang & Waimey; Jonathan Kang; Jeffrey Lotspeich (57) ABSTRACT

The present invention relates to a wireless communication system and, more specifically, to a method and an apparatus for packet-switched (PS) service handover. The method for performing packet-switched service handover in a terminal of a wireless communication system according to one embodiment of the present invention comprises the steps of: receiving handover policy information from a network node; and determining whether or not to perform the PS service handover in accordance with the handover policy information. The handover policy information may include information indicating a PS service handover event.

10 Claims, 4 Drawing Sheets

(56) References Cited

U.S. PATENT DOCUMENTS

| | | | | |
|---|---|---|---|---|
| 2011/0002466 | A1* | 1/2011 | Kwak | H04L 63/0428 380/272 |
| 2011/0271117 | A1* | 11/2011 | Qiang | H04L 63/164 713/181 |
| 2012/0069817 | A1* | 3/2012 | Ling | H04W 36/14 370/331 |
| 2012/0122459 | A1* | 5/2012 | Wu | H04W 36/0022 455/437 |
| 2013/0064221 | A1* | 3/2013 | Pampu | H04W 36/0033 370/331 |

OTHER PUBLICATIONS

Tanaka, et al., "CS Fallback Function for Combined LTE and 3G Circuit Switched Services," Special Articles on SAE Standardization Technology, Technical Journal vol. 11, No. 3, Dec. 2009, 7 pages.
Cho, "Trend on standardization for support voice service in LTE net," TTA Journal vol. 139, Jan. 2012, pp. 100-103.
PCT International Application No. PCT/KR2013/003065, Written Opinion of the International Searching Authority dated Jul. 5, 2013, 19 pages.

* cited by examiner

METHOD AND APPARATUS FOR PACKET-SWITCHED SERVICE HANDOVER IN WIRELESS COMMUNICATION SYSTEM

CROSS-REFERENCE TO RELATED APPLICATIONS

This application is the National Stage filing under 35 U.S.C. 371 of International Application No. PCT/KR2013/003065, filed on Apr. 12, 2013, which claims the benefit of U.S. Provisional Application Ser. Nos. 61/623,069, filed on Apr. 12, 2012 and 61/682,778, filed on Aug. 14, 2012, the contents of which are all hereby incorporated by reference herein in their entirety.

TECHNICAL FIELD

The present invention relates to a wireless communication system, and more particularly, to a method of performing a packet switched service handover and apparatus therefor.

BACKGROUND ART

If a user equipment currently operating on one access network supportive of both a CS (circuit switched) service and a PS (packet switched) service simultaneously or a network supportive of the PS service only moves away into another access network due to RAT (radio access technology) chance or CSFB (circuit switched fallback), the PS service (e.g., bearer) can be processed in a manner that the PS service is suspended, that the PS service is partially dropped, or that QoS (quality of service) is lowered.

In case that there exists another access network capable of handing over a PS service without causing damage to a user experience for the corresponding PS service, it is preferable that the PS service is handed over in the above situation. However, a related art wireless communication has failed to define an operation of handing over the PS service into another access network in the above situation.

DISCLOSURE OF THE INVENTION

Technical Task

The technical task of the present invention is to provide a new method of handing over a PS service.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

To achieve these and other advantages and in accordance with the purpose of the present invention, as embodied and broadly described, a method of performing a handover of a PS (packet switched) service in a user equipment of a wireless communication system according to one embodiment of the present invention may include the steps of receiving a handover policy information from a network node and determining whether to perform the handover of the PS service based on the handover policy information, wherein the handover policy information includes an information indicating an event for performing the handover of the PS service.

To further achieve these and other advantages and in accordance with the purpose of the present invention, as embodied and broadly described, in performing a handover of a PS (packet switched) service in a wireless communication system, a user equipment device according to another embodiment of the present invention may include a transceiving module and a processor receiving a handover policy information from a network node using the transceiving module, the processor configured to determine whether to perform the handover of the PS service based on the handover policy information, wherein the handover policy information includes an information indicating an event for performing the handover of the PS service.

The following matters may be commonly applicable to the embodiments of the present invention.

The event may be set to a value indicating a 3GPP ($3^{rd}$ generation partnership project) PS handover failed or a CS (circuit switched) call requested.

The handover policy information may further include an information indicating a target access technology of the handover of the PS service.

The information indicating the target access technology may be set to a value indicating a non-3GPP access technology.

The non-3GPP access technology may include WiFi.

The handover policy information may further include at least one of an access ID information, a secondary access ID information and an access network priority information.

The handover policy information may further include an information on a user equipment's location at which the handover of the PS service is performed.

The handover policy information may further include an information on at least one of an IP (internet protocol) flow for performing the handover of the PS service and an APN (access point name) for performing the handover of the PS service.

The step of determining whether to perform the handover of the PS service may be performed if recognizing that the PS service is not supported by a target cell or a target RAT (radio access technology) into which the user equipment attempts to move.

The step of determining whether to perform the handover of the PS service may be performed before performing a suspending operation of the PS service.

The step of determining whether to perform the handover of the PS service may be performed before a CSFB (circuit switched fall back) is performed after occurrence of a request for a voice call.

The handover policy information may be provided together with ISMP (inter-system mobility policy) information or ISRP (inter-system routing policy) information.

The handover policy information may be received in response to a policy information request transmitted to the network node by the user equipment.

The network node may include ANDSF (access network discovery and selection function).

The aforementioned general description and the detailed description of the present invention mentioned in the following description are exemplary and provided for the additional description of the invention described as claims.

Advantageous Effects

The present invention can provide a new method and apparatus for handing over a PS service.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

Figure 1:
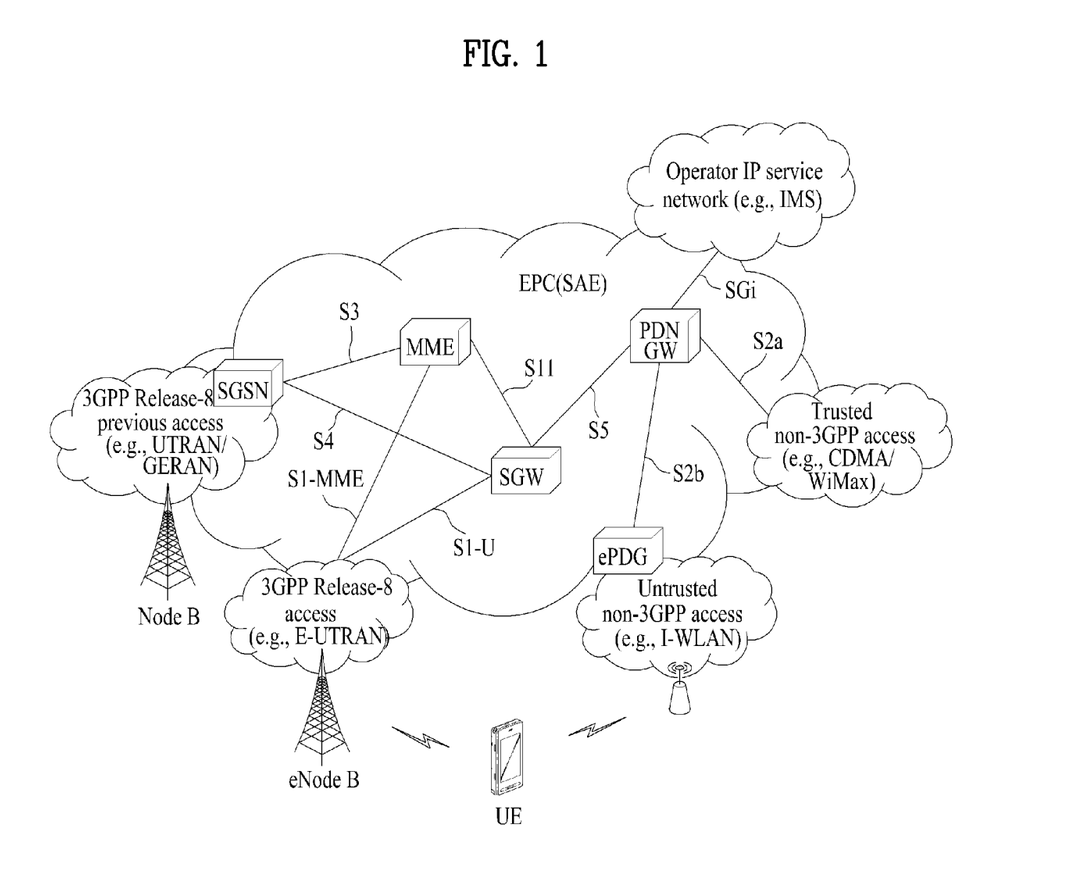

FIG. 1 is a diagram for a schematic structure of EPS (evolved packet system) including RPC (evolved packet core).

Figure 2:
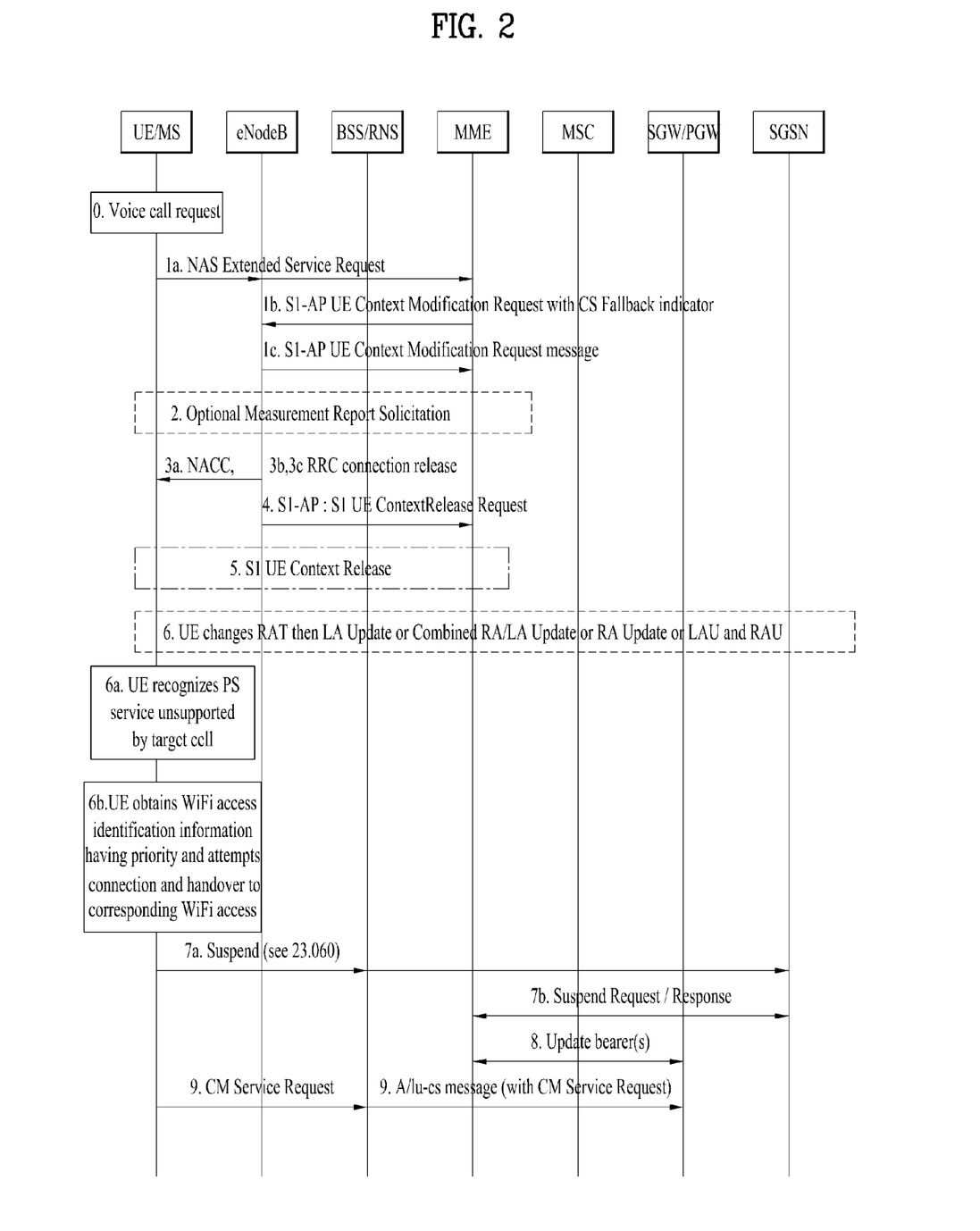

FIG. 2 is a diagram for one example to describe a handover operation into a non-3GPP access network according to the present invention.

Figure 3:
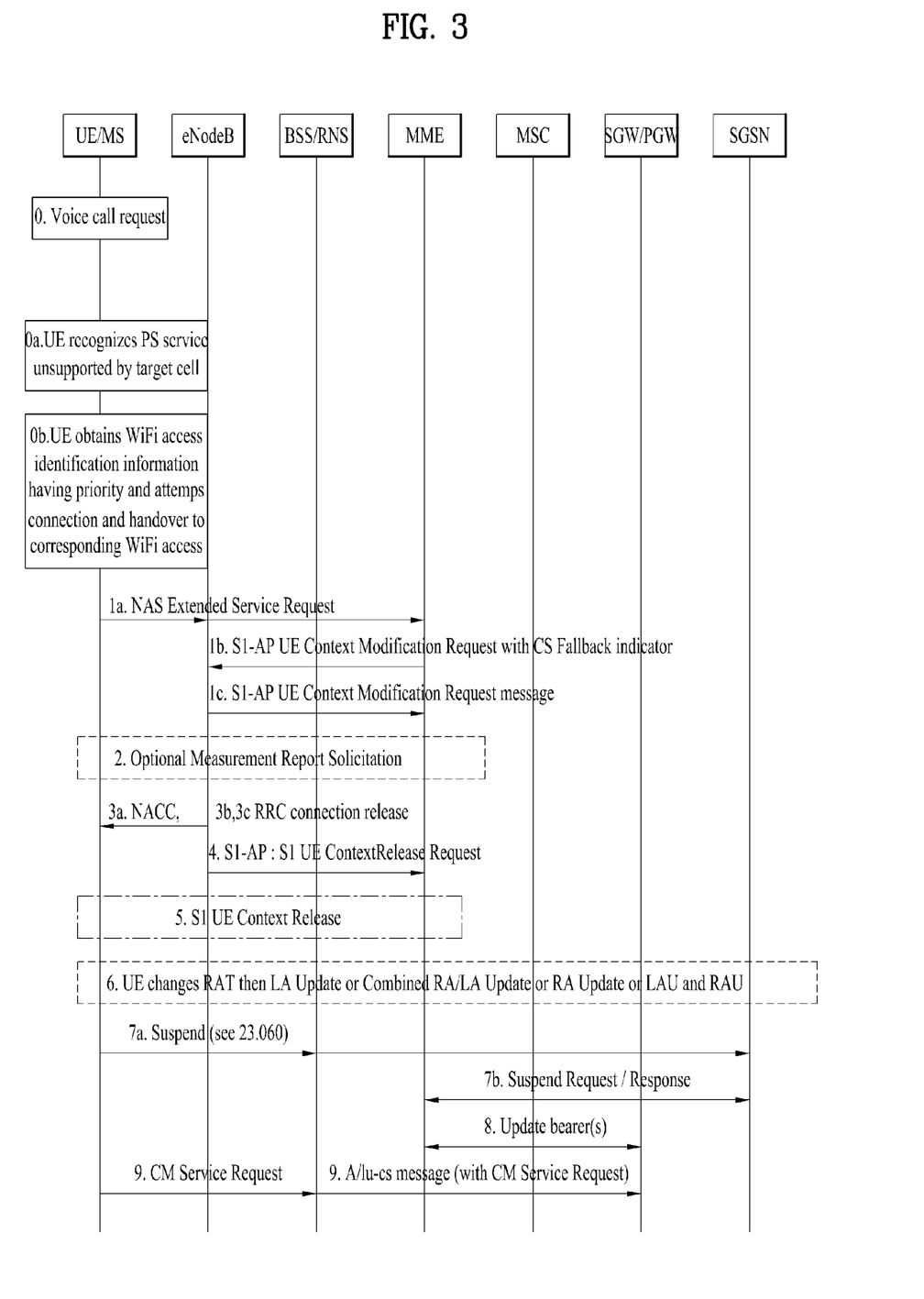

FIG. 3 is a diagram for another example to describe a handover operation into a non-3GPP access network according to the present invention.

Figure 4:
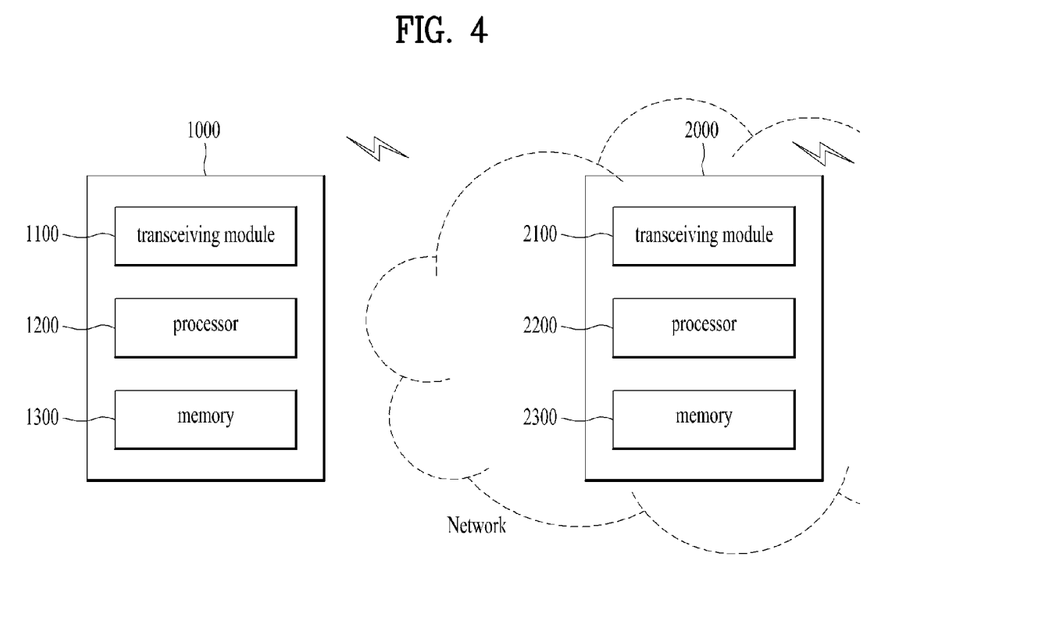

FIG. 4 is a diagram for one example of the configuration of a user equipment (UE) device and a network node device according to a preferred embodiment of the present invention.

BEST MODE FOR INVENTION

First of all, the following embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, an embodiment of the present invention may be implemented by combining elements and/or features together in part. A sequence of operations explained for each embodiment of the present invention may be modifiable. Some configurations or features of one embodiment may be included in another embodiment or substituted with corresponding configurations or features of another embodiment.

Specific terminologies used for the following description may be provided to help the understanding of the present invention. And, the use of the specific terminology may be modified into other forms within the scope of the technical idea of the present invention.

Occasionally, to avoid obscuring the concept of the present invention, structures and/or devices known to the public may be skipped or represented as block diagrams centering on the core functions of the structures and/or devices. Wherever possible, the same reference numbers will be used throughout the drawings to refer to the same or like parts in this specification.

Embodiments of the present invention can be supported by the disclosed standard documents of at least one of wireless access systems including IEEE (institute of electrical and electronics engineers) 802 series system, 3GPP system, 3GPP LTE system, and 3GPP LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description can apply to various wireless access systems. For clarity, the following description mainly concerns 3GPP LTE system and 3GPP LTE-A system, by which the technical idea of the present invention may be non-limited.

Terminologies mentioned in the present document can be defined as follows.

UMTS (Universal Mobile Telecommunications System): $3^{rd}$ generation mobile communication technology developed by 3GPP on the basis of GSM (Global System for Mobile Communication).

EPS (Evolved Packet System): Network system configured with EPC (Evolved Packet Core) corresponding to an IP based packet switched core network and an access network such as LTE, UTRAN and the like. This is a UMTS evolved network.

NodeB: Base station of GERAN/UTRAN. This is installed outdoor and its coverage amounts to a macro cell scale.

eNodeB: Base station of LTE. This is installed outdoor and its coverage amounts to a macro cell scale.

HNB (Home NodeB): CPE (Customer Premises Equipment) configured to provide UTRAN (UMTS Terrestrial Radio Access Network) coverage. For details, the standard document TS 25.467 can be referred to.

HeNB (Home eNodeB): CPE (Customer Premises Equipment) configured to provide E-UTRAN (Evolved-UTRAN) coverage. For details, the standard document TS can be referred to.

UE (User Equipment): User device. UE can be called such a terminology as a terminal, an ME (Mobile Equipment), an MS (Mobile Station) and the like. The UE may include such a portable device as a notebook (laptop), a mobile phone, a PDA (Personal Digital Assistant), a smartphone, a multimedia device and the like. Moreover, the UE may include such a non-portable device as a PC (Personal Computer), a vehicle mounted device and the like. The UE is configured to communicate by 3GPP spectrum such as LTE and/or non-3GPP spectrum such as WiFi, Public Safety Spectrum and the like.

RAN (Radio Access Network): Unit including NodeB, eNodeB and RNC (Radio Network Controller) for controlling the NodeB or eNodeB. This exists between UE and core network and provides a connection to a core network.

MME (Mobility Management Entity): Network node of EPS network for performing Mobility Management (MM) function and Session Management (SM) function.

HLR/HSS (Home Location Register/Home Subscriber Server): Database having subscriber information in 3GPP network. HSS is able to perform such a function as configuration storage, identity management, user status storage and the like.

PDN-GW (Packet Data Network-Gateway)/PGW: Network node of EPS network for performing such a function as UE IP address assignment, packet screening & filtering, charging data collection and the like.

SGW (Serving Gateway): Network node of EPS network for performing such a function as mobility anchor, packet routing, idle mode packet buffering, a function of triggering MME to page UE, and the like.

PCRF (Policy and Charging Rule Function): Node of EPS network for making a policy decision to dynamically apply QoS (Quality of Service) and charging policy differentiated per service flow.

NAS (Non-Access Stratum): Upper stratum of a control plane between UE and MME. This is a functional layer for exchanging signaling and traffic messages between UE and core network in LTE/UMTS protocol stack and its major functions are to support mobility of UE and a session management procedure for establishing and managing IP connection between UE and PDN GW.

PDN (Packet Data Network): Network in which such a server configured to support a specific service as an MMS (Multimedia Messaging Service) server, a WAP (Wireless Application Protocol) server and the like is located.

PDN connection: Logical connection between UE and PDN by being represented as a single IP address (single IPv4 address and/or single IPv6 prefix).

APN (Access Point Name): Text string indicating or identifying a PDN. In order to access a requested service or network (PDN), it is necessary to pass through a corresponding PGW. Hence, APN is a name (i.e., text string) previously defined in a network to discover the corresponding PGW. For instance, APN can be denoted by internet.mnc012.mcc345.gprs.

AS (Access-Stratum): This includes a protocol stack between UE and radio network or between UE and access network. This is a layer responsible for a data transmission, a network control signal transmission and the like.

PLMN (Public Land Mobile Network): Network configured to provide a mobile communication service to individuals. This can be configured in a manner of being discriminated for each operator.

CSFB (Circuit Switched FallBack): Operation for UE in E-UTRAN access to fall back to UTRAN/GERAN CS domain access. By CSFB, various CS domain services such as a voice service and the like can be provided (cf. Standard Document 3GPP TS 23.272).

MAPCON (Multiple-Access PDN Connectivity): Technology for supporting establishment of a plurality of PDN connections through different access networks.

IFOM (IP Flow Mobility): Technology for moving a wireless access by IP flow unit seamlessly or selectively.

NSWO (Non-Seamless WLAN Offload): Technology for transmitting IP flow by internet through WLAN access network but failing to secure mobility instead of transferring IP flow seamlessly.

LIPA (Local IP Access): Technology for an IP capable UE to access another IP capable entity in the same IP network via H(e)NB.

SIPTO (Selected IP Traffic Offload): Technology for diverting user's traffic in a manner that an operator selects a PGW (Packet data network GateWay) located physically close to a UE in EPC network.

ANDSF (Access network discovery and selection function): Entity responsible for a function for a UE to discover a non-3GPP access network (e.g., wireless LAN (WLAN (or WiFi)), Wimax, etc.) additionally usable for 3GPP access network (e.g., LTE(Long Term Evolution), LTE-A (Advanced), etc.) for data communications and to provide rules and policies required for accessing corresponding networks. In accordance with operator's settings, ANDSF can provide UE with Inter-System Mobility Policy (ISMP), Inter-System Routing Policy (ISRP), Discovery Information and the like.

EPC (Evolved Packet Core)

FIG. 1 is a diagram for a schematic structure of EPS (evolved packet system) including RPC (evolved packet core).

The EPC is a core element of SAE (system architecture evolution) for enhancing performance of the 3GPP technologies. The SAE corresponds to a study task for determining a network structure supportive of mobility between various kinds of networks. For instance, the goal of the SAE is to provide an optimized packet-based system capable of supporting various wireless access technologies based on IP and providing a further enhanced data transmission capability.

In particular, the EPC is a core network of an IP mobile communication system for 3GPP LTE system and is able to support a packet-based real-time/non-real-time service. In an existing mobile communication system (e.g., $2^{nd}$ generation mobile communication system, $3^{rd}$ generation mobile communication system, etc.), a function of the core network is implemented through 2 distinctive subdomains such as a CS (circuit-switched) subdomain for audio and a PS (packet-switched) subdomain for data. Yet, in the 3GPP LTE system evolved from the $3^{rd}$ generation mobile communication system, the CS subdomains and the PS subdomains are integrated into a single IP domain. In particular, in the 3GPP LTE system, a connection between user equipments having IP capability can be configured through an IP based base station (e.g., eNodeB (evolved Node B)), an EPC, and an application domain (e.g., IMS (IP multimedia subsystem)). In particular, the EPC is the structure mandatory for end-to-end IP service implementation.

The EPC can include various components. In the example shown in FIG. 1, the EPC includes some of the various components such as SGW (Serving Gateway), PDN GW (Packet Data Network Gateway), MME (Mobility Management Entity), SGSN (Serving GPRS (General Packet Radio Service) Supporting Node), and ePDG (enhanced Packet Data Gateway).

The SGW operates as a boundary point between a RAN (Radio Access Network) and a core network and is the component playing a role in maintaining a data path between an eNodeB and a PDN GW. If a user equipment moves across an area served by an eNodeB, the SGW plays a role as a mobility anchor point. In particular, for the mobility within Evolved-UMTS (Universal Mobile Telecommunications System) Terrestrial Radio Access Network defined after E-UTRAN (3GPP Release-8, packets can be routed through the SGW. And, the SGW can play a role as an anchor point for mobility with another 3GPP network (i.e., RAN defined before 3GPP Release-8) (e.g., UTRAN, GERAN (GSM/EDGE (Global System for Mobile Communication/Enhanced Data rates for Global Evolution) Radio Access Network).

The PDN GW corresponds to a termination end point of a data interface toward a packet data network. The PDN GW is able to support policy enforcement features, packet filtering, charging support and the like. And, the PDN GW can play a role as an anchor point for management of mobility with 3GPP network and non-3GPP network (e.g., an unreliable network such as I-WLAN (Interworking Wireless Local Area Network), a reliable network such as CDMA (Code Division Multiple Access) network and WiMax).

In the example of the network structure shown in FIG. 1, the SGW and the PDN GW are configured as separate gateways, respectively. Alternatively, the two gateways can be implemented according to a single gateway configuration option.

The MME is the component that performs signaling and control functions for supporting an access for a network connection of a user equipment, allocation of network resources, tracking, paging, roaming, handover and the like.

The MME controls control plane function related to subscriber and session managements. The MME manages a number of eNodeB's and performs a signaling for selecting an existing gateway for a handover into a different 2G/3G network. And, the MME performs such a function as Security Procedures, Terminal-to-network Session Handling, Idle Terminal Location Management, and the like.

The SGSN handles all packet data for user's mobility management and authentication for a different 3GPP network (e.g., GPRS network).

The ePDG plays a role as a security node for an unreliable non-3GPP network (e.g., I-WLAN, WiFi hotspot, etc.).

As mentioned in the foregoing description with reference to FIG. 1, a user equipment having IP capability can access an IP service network (e.g., IMS) provided by a service provider (i.e., an operator) via various components within the EPC based on a non-3GPP access as well as on a 3GPP access.

Moreover, FIG. 1 shows various reference points (e.g., S1-U, S1-MME, etc.). In the 3GPP system, a conceptional link for connecting 2 functions existing in different functional entities of E-UTRAN and EPC is defined as a reference point. Table 1 organizes the reference points shown in FIG. 1. Various reference points can exist in accordance with network structures as well as the examples shown in Table 1.

TABLE 1

| Reference point | Description |
| --- | --- |
| S1-MME | Reference point for a control plane protocol between E-UTRAN and MME |
| S1-U | Reference point between E-UTRAN and SGW for inter-eNodeB path switching during a handover and user plane tunneling per bearer |
| S3 | Reference point between MME and SGSN providing user and bearer information exchange for inter-3GPP access network mobility in idle and/or active state. This reference point is usable for intra-PLMN or inter-PLMN (e.g., case of inter-PLMN handover). |
| S4 | Reference point between SGW and SGSN providing a related control and mobility support between 3GPP anchor functions of GPRS core and SGW. If a direct tunnel is not established, this reference point provides user plane tunneling. |
| S5 | Reference point providing user plane tunneling and tunnel management between SGW and PDN GW. Due to UE mobility and for a requested PDN connectivity, if a connection to PDN GW failing to be co-located with SGW is necessary, this reference point is used for SGW rearrangement. |
| S11 | Reference point between MME and SGW |
| SGi | Reference point between PDN GW and PDN. The PDN may include an operator external common or a private PDN or an intra-operator PDN for providing IMS service for example. This reference point corresponds to Gi of 3GPP access. |

The S2a and S2b among the reference points shown in FIG. 1 correspond to Non-3GPP interfaces. The S2a is a reference point that provides a user plane with a related control and mobility support between a reliable non-3GPP access and PDN GW. The S2b is a reference point that provides a user plane with a related control and mobility support between ePDG and PDN GW.

PS Service Handover

The present invention provides a new method of handing over a PS service between a 3GPP access network and a non-3GPP access network (e.g., WLAN) in 3GPP GSM/UMTS/EPS (Global System for Mobile Communication/Universal Mobile Telecommunication System/Evolved Packet System) based mobile communication system. A previously defined wireless communication system (e.g., EPS) can support a non 3GPP access network, and more particularly, a connection on WLAN (or WiFi). A procedure for obtaining a connection on a trusted or untrusted WiFi and a procedure for a handover of IP traffic between a 3GPP access network and a WiFi are defined in the EPS standard. In EPS, ANDSF provides a mechanism capable of determining whether a prescribed access technology is preferred for a specific IP traffic on a specific condition (using ISRP, for example), which is applicable to both mobility and NSWO (Non-seamless WiFi Offloading) of the traffic connected through the EPC.

In EPS, IP traffic can be handed over between RATs (radio access technologies). For instance, it is able to assume a case that IP traffic currently serviced on E-UTRAN is handed over into UTRAN or GERAN. In this case, according to a previously defined handover mechanism, EPS bearers may be dropped or QoS may be lowered, depending on QoS (quality of service) of EPS bearers, availability of radio resources of a target RAT, a network policy and the like, which may lead to a problem of affecting a user experience, a problem of losing or disconnecting a service, and the like.

In a situation that WiFi is available and preferred for a specific IP traffic, if the corresponding IP traffic can be transferred to WiFi directly by avoiding being transferred to a target RAT (e.g., GERAN, UTRAN, etc.) in the course of a handover of a PS service, a bearer loss can be prevented as well as a delay and cost caused by an additional operation of performing a handover into WiFi after a handover into the target RAT.

Yet, according to the mechanism defined by an existing wireless communication system, since relative priorities between WLAN and several 3GPP access networks are not considered, mobility to WiFi is not allowed for the traffic having a degraded service in case of a PS handover or CSFB into UTRAN/GERAN from E-UTRAN. Moreover, as mentioned in the foregoing description, since the mechanism for reducing the potential loss, quality degradation, bearer suspension and the like due to the inter 3GPP RAT handover and the handover into WiFi does not exist, it is unable to prevent bad influence on a user experience.

In order to solve the above problems, the present invention proposes a method of efficiently supporting a PS handover (HO) between a 3GPP access network and a non-3GPP access network.

A PS HO method proposed by the present invention is exemplarity applicable to the following scenarios. For instance, the PS HO method proposed by the present invention can be applied to such a scenario as Intra-RAT PS HO (e.g., in a handover from HSPA into UTRAN R99 cells, a case that a WiFi access is preferred to UTRAN R99 but not to HSPA), Inter-RAT PS HO (e.g., in a handover from E-UTRAN into UTRAN/GERAN, a case that a WiFi access is preferred to UTRAN/GERAN but not to E-UTRAN), CSFB into GERAN not supportive of DTM (Dual Transfer Mode) (e.g., the problem of the PS service suspended situation can be solved in a manner that a UE hands over the PS service suspended due to CSFB into WiFi), CSFB into UTRAN not supportive of PS HO (e.g., a case that a network operator does not support the PS HO, a case that the problem of the PS service suspended situation can be solved in a manner that a UE hands over the PS service suspended due to CSFB into WiFi), CSFB supportive of PSHO (e.g., like the general PS HO situation, the PS service suspended situation or the service degraded situation can be settled in a manner of handing over the lost or QoS-lowered PS service into WiFi), and the like. Yet, the above scenarios are provided for example only. And, the method proposed by the present invention can be applied to various PS HO required scenarios in a situation (i.e., a WiFi accessed state or a WiFi accessible case) that a UE having a PS service on a cellular access network is able to use WiFi.

According to the methods proposed by the present invention, a cost caused by the application of the present invention can be reduced by minimizing changes of an existing technology. And, in the WiFi preferred situation, as mentioned in the foregoing description, it is able to prevent such an unnecessary procedure such as a change to another RAT and the like.

As mentioned in the foregoing description, according to a previously defined CSFB operation, when a voice service is used through CSFB, RAT is changed into 2G or 3G. If the changed RAT is not supportive of a PS service, a UE recognizes it and is then able to suspend the PS service. Meanwhile, a policy provided by ANDSF in case of applying the ANDSF may be selected by an IP interface preferred per IP flow.

The present invention proposes a method of solving the above-mentioned problems of the related art by newly defining an operation of CSFB and a policy of ANDSF.

In particular, using a process for a UE to move from E-UTRAN into another 3GPP access (e.g., another 3GPP access network, another RAT, etc.) (i.e., a process related to mobility or RAT change), an operation proposed by the present invention is described. After an information on a non-3GPP access available for a UE has been provided to the UE, if a 3GPP access network into which the UE has moved into does not support a PS service or an access preferred to the 3GPP access exists, a method for the UE to keep being provided with the PS service through the non-3GPP access (e.g., WiFi) without performing an action of suspending the PS service, an action of lowering QoS and the like is described as follows.

To this end, it is able to provide policy information related to a non-3GPP access network selection to a UE through ANDSF. Based on the provided policy information, the UE can attempt a handover into a non-3GPP access network. Hence, the UE is able to maintain a PS service by moving into a non-3GPP access network area without suspending an ongoing IP flow before an RAT change or movement into a 3GPP access network or lowering QoS.

Embodiment 1

The present embodiment relates to a case of performing an operation of handing over a PS service into a non-3GPP access network in case of CSFB.

FIG. 2 is a diagram for one example to describe a handover operation into a non-3GPP access network according to the present invention.

In a step 0 of FIG. 2, a UE may have a request for a voice call. For instance, in case that a voice call request is made to an NAS (non-access stratum) from an application layer, CSFB can be performed. The request for the voice call may include a request for MO (mobile originated) call or MT (mobile terminated) call.

In this case, the UE may be attached to a CS domain as well as to an EPS domain by performing a combined EPS/IMSI (international mobile subscriber identity) attach operation to receive a CSFB service. In particular, it may be a state that an MME has made a registration for the UE at an MSC of the CS domain through an SGs interface.

In a step 1*a* of FIG. 2, the UE may send an extended service request message to the MME via eNodeB to initiate a CSFP procedure. In this case, the extended service request message may include an information indicating a CSFB request. In particular, in case of the CSFB for the MT call, a following operation may be performed. First of all, a paging requested is delivered to the MME from the MSC prior to the step 1. Secondly, the MME sends a CS (circuit switched) service notification to the UE. Finally, the MME forwards a service request to the MSC.

In a step 1*b* of FIG. 2, the MME can send a UE context modification request message to the eNodeB. The UE context modification request message may contain a CSFB indicator information. Through the CSFB indicator information, the eNodeB can be aware that the UE should perform a RAT change into GERAN/UTRAN for the CSFB. Moreover, the UE context modification request message may contain a location are identity (LAI) information of the UE registered CS domain.

In a step 1*c* of FIG. 2, the eNodeB can send a UE context modification response message to the MME in response to the received UE context modification request message.

In a step 2 of FIG. 2, in order to determine a target GERAN/UTRAN cell for redirecting the UE, the eNodeB can make a request for a measurement report to the UE. In this case, the step 2 may be performed optionally.

In a step 3 of FIG. 2, the eNodeB performs one of a step 3*a*, a step 3*b* and a step 3*c*.

If the target cell is GERAN and both of the UE and the network support an inter-RAT cell change order, the step 3*a* of FIG. 2 is the step for the eNodeB to send the UE an RRC (radio resource control) message in order for the UE to perform the inter-RAT cell change order into a GERAN neighbor cell. This may be called NACC (network assisted cell change).

If one of the UE and the network does not support the inter-RAT PS HO into GERAN/UTRAN from E-UTRAN as well the inter-RAT cell change order into GERAN, the step 3*b* of FIG. 2 is the step for the eNodeB to perform an RRC connection release with redirection to GERAN or an RRC connection release with redirection to UTRAN.

If the UE and the network support 'RRC connection release with redirection and Multi Cell System Information to GERAN/UTRAN', the step 3*c* of FIG. 2 is the step for the eNodeB to perform an RRC connection release with the redirection to GERAN or an RRC connection release with the redirection to UTRAN by including at least one or more physical cell identities and system information associated with them.

In a step 4 of FIG. 2, the eNodeB is able to send a UE content release request message to the MME. If the target cell is GERAN and at least one of the target cell and the UE fails to support DTM, the UE context release request message may contain an information indicating that the UE is unable to use the PS service in the target cell.

Regarding a step 5 of FIG. 2, the MME can send an access bearer release request message (Release Access Bearers Request) to an S-GW. Subsequently, the S-GW can release all S1-U bearers (i.e., bearers between the S-GW and the eNodeB) related to the UE. And, the S-GW releases all eNodeB related informations (e.g., an address of the eNodeB, a tunnel endpoint ID (TEID), etc.) on the UE and is then able to send an access bearer release response message to the MME. Hence, other context informations on the UE, which are saved in the S-GW) continues to be saved without being affected. The MME is able to release an S1 interface by sending a UE context release command message to the eNodeB. If the RRC connection is not released yet, the eNodeB can send an RRC connection release message to the UE. If the RRC connection release message is acknowledged by the UE, the eNodeB may delete the UE context information. Thereafter, the eNodeB sends a UE context release complete message to the MME, thereby confirming the S1 release. Thus, the signaling connection between the ME and the eNodeB for the UE can be released.

In a step 6 of FIG. 2, the YE performs an RAT change into a new cell of the GERAN or a target RAT and is able to configure a radio signaling connection. If a location area (LA) saved in the UE is different from an LA of the new cell, the UE can perform a location area update (LAU). Moreover, the UE determines whether a routing area update (RAU) needs to be performed. If the RAU is necessary, the UE can perform the RAU.

In a step 6a of FIG. 2, the UE can recognize that the target RAT fails to support the PS service (or, when the target RAT is GERAN, the UE or target cell fails to support DTM). This can be performed prior to or along with the step 6a based on at least one of an information received from the network or a capability information of the UE. For instance, the NACC in the step 3 can contain an information indicating that the corresponding UE is unable to use the PS service. Hence, the UE may be able to recognize that a PS handover into another access network is necessary.

In this case, according to a related art, the UE sends a suspend message to an SGSN through BSS/RNS (base station subsystem/radio network system) [Step 7a] and the SGSN is able to send a suspend message (or a suspend notification message) to the MME. Although GUTI (globally unique temporary identity) is not derived from a pair of P-TMSI (packet-temporary mobile subscriber identity) and RAI (routing area identification), the MME can send a suspend response message (or a suspend acknowledge message) to the SGSN in response to the suspend request message from the SGSN [Step 7b]. Hence, a bearer update including a dedicated bearer deactivation initiated by the MME is performed [Step 8], the UE is able to send a connection management (CM) service request message to the BSS/RNS, and A/Iu-cs message can be sent to the MSC from the BSS/RNS [Step 9]. Consequently, the UE suspends the PS service previously provided on the E-UTRAN and is able to perform a voice call on the target cell of the CSFB or the target RAT.

Yet, in case that the UE recognizes that the PS service is not supported in the target RAT or the target cell, the present invention proposes the UE to attempt a handover into WiFi like the step 6b.

In particular, in the step 4 of FIG. 2, the network can recognize that the PS service is not supported in the target cell or the target RAT (i.e., through a network node (e.g., eNodeB, MME, etc.)). In the step 6a of FIG. 2, the UE can recognize that the PS service is not supported in the target cell or the target RAT. In this case, according to the present invention, instead of initiating a process for suspending a PS service like the related art, the UE attempts to discover an available non-3GPP access network (e.g., WiFi, etc.). IF the non-3GPP access network is discovered, the UE can perform a handover by connecting to an existing P-GW.

A detailed process of a handover of PS service into a non-3GPP access network according to a proposal made by the present invention is a non-3GPP access reliable from a 3GPP access and may operate in a manner similar to a process for handing over/transferring an IP flow by APN unit [cf. 8.2.2 of Standard Document TS 23.402]. Yet, a PS handover of the present invention should differ from an existing PS handover into a non-3GPP access network in being performed as a solution for a case that a target RAT or a target cell, into which a UE intends to move, fails to support a PS service (e.g., a case that a PS service is suspended in the course of CSFB according to an existing operation).

In the step 6a or the step 6b, the UE can determine whether to perform a handover into the non-3GPP access network based on the ANDSF policy information. For instance, the ANDSF policy information may include a location of the UE (e.g., a cell identifier information, a GPS information, etc.), an information (e.g., an access technology, an access ID (e.g., SSID (service set ID) of WLAN, WiFi NAP-ID (network access point-ID), etc.), etc.) on a preferred access or an access having a priority, a data to be handed over, and the like. Based on a combination of at least one of these informations, it is able to determine the handover into the non-3GPP access network.

In brief, before a UE performs the suspension of a PS service, as proposed by the present invention, the UE establishes a connection to P-GW through a non-3GPP access network and is then able to transceive data by performing a handover. Moreover, a UE makes a request for a handover into a non-3GPP access network and then receives a response for the handover from a P-GW or the non-3GPP access network. If a PS service is left on a 3GPP access network, the UE can suspend or release the left PS service.

Embodiment 2

The present embodiment relates to a case that an operation of handing over a PS service into a non-3GPP access network in case of CSFB.

FIG. 3 is a diagram for another example to describe a handover operation into a non-3GPP access network according to the present invention.

First of all, since a step 0 of FIG. 3 is identical to the former step 0 of FIG. 2, the redundant description shall be omitted from the following description.

In a step 0a and a step 0b of FIG. 3, according to the present embodiment, before a UE performs a transmission of (i.e., a step 1a) of an extended service request, the UE can perform a handover into a non-3GPP access network (e.g., WiFi).

To this end, if a request for a voice call is received from an upper stratum or before an NAS message is delivered, the UE can determine whether to perform a handover into the non-3GPP access network based on ANDSF policy information. For instance, the ANDSF policy information may include a location of the UE (e.g., a cell identifier information, a GPS information, etc.), an information (e.g., an access technology, an information (e.g., SSID, WiFi ID, etc.), etc.) on a preferred access or an access having a priority, a data to be handed over, and the like. Based on a combination of at least one of these informations, it is able to determine the handover into the non-3GPP access network.

If it is determined to perform the handover into the non-3GPP access network in accordance with the ANDSF policy, the UE attempts the handover into the non-3GPP access network. If the handover is completed (or fails), the UE can initiate a CSFB process by delivering an extended service request message in a step 1a to a network.

Steps 1a to 9 of FIG. 3 are identical to the former steps 1a to 9 of FIG. 2, the redundant description shall be omitted from the following description.

Embodiment 3

In the step 6a of the embodiment 1 or the step 0a of the embodiment 2, a UE can determine whether to perform a handover into a non-3GPP access, which can be performed based on a policy information provided from ANDSF. When a UE performs a PS handover into a non-3GPP access network (e.g., WiFi), the related art fails to define an operation of determining whether to perform a PS handover based on a policy information provided from ANDSF.

The present embodiment proposes a new information added to a policy provided by ANDSF.

ANDSF policy information may be provided to a UE in advance. ANDSF policy information may be provided to a UE in case of a specific event (e.g., inter-cell movement).

ISMP (inter system mobility policy) in the ANDSF policy information may include information on a rule and preference defined by an operator and may become a basis of determination on inter-system mobility.

In particular, assume that a UE can transmit IP traffic through a single radio access only at a specific timing point. In this case, the UE can determine a timing for restricting or allowing inter-system mobility based on ISMP. Moreover, the UE can select a most preferred radio access technology type or a most preferred access network from technologies or networks available for an access to EPC based on ISMP.

ISMP format in an existing ANDSF information can be configured as Table 2.

TABLE 2

<X>/Policy
<X>/Policy/<X>
<X>/Policy/<X>/RulePriority
<X>/Policy/<X>/PrioritizedAccess
<X>/Policy/<X>/PrioritizedAccess/<X>
<X>/Policy/<X>/PrioritizedAccess/<X>/ AccessTechnology
<X>/Policy/<X>/PrioritizedAccess/<X>/ AccessId
<X>/Policy/<X>/PrioritizedAccess/<X>/ SecondaryAccessId
<X>/Policy/<X>/PrioritizedAccess/<X>/ AccessNetworkPriority
<X>/Policy/<X>/ValidityArea
<X>/Policy/<X>/ValidityArea/3GPP_Location
<X>/Policy/<X>/ValidityArea/3GPP_Location/<X>
<X>/Policy/<X>/ValidityArea/3GPP_Location/<X>/PLMN
<X>/Policy/<X>/ValidityArea/3GPP_Location/<X>/TAC
<X>/Policy/<X>/ValidityArea/3GPP_Location/<X>/LAC
<X>/Policy/<X>/ValidityArea/3GPP_Location/<X>/GERAN_CI
<X>/Policy/<X>/ValidityArea/3GPP_Location/ <X>/UTRAN_CI
<X>/Policy/<X>/ValidityArea/3GPP_Location/ <X>/EUTRA_CI
. . .
<X>/Policy/<X>/ValidityArea/WLAN_Location
<X>/Policy/<X>/ValidityArea/WLAN_Location/<X>
<X>/Policy/<X>/ValidityArea/WLAN_Location/<X>/HESSID
<X>/Policy/<X>/ValidityArea/WLAN_Location/<X>/SSID
<X>/Policy/<X>/ValidityArea/WLAN_Location/<X>/BSSID
<X>/Policy/<X>/ValidityArea/Geo_Location
<X>/Policy/<X>/ValidityArea/Geo_Location/Circular
<X>/Policy/<X>/ValidityArea/Geo_Location/Circular/<X>
<X>/Policy/<X>/ValidityArea/Geo_Location/Circular/<X>/ AnchorLatitude
<X>/Policy/<X>/ValidityArea/Geo_Location/Circular/<X>/ AnchorLongitude
<X>/Policy/<X>/ValidityArea/Geo_Location/Circular/<X>/ Radius
. . .

In Table 2, <X> indicates a placeholder and can be understood as a hierarchical extension. <X>/Name means a name of ANDSF Management Object (MO) configuration. In particular, <X>/Policy/<X> is a placeholder of policies for ISMP (meanwhile, a place holder of policies for ISRP can be represented as <X>/ISRP/<X>. Moreover, <X>/Policy/<X>/RulePriority means a priority given to a specific rule and can be represented as a numerical value. Although Table 2 shows one example of applying by priority for ISMP, the priority can apply per category or rule.

In Table 2, PrioritizedAccess is a category that indicates an access preferred for a specific rule. Parameter 'AccessTechnology' can have a value that indicates one of access technologies including 3GPP, WLAN, WiMAX and the like. Parameter 'AccessId' can have a value that indicates an identifier (e.g., SSID in case of WLAN, NAP-ID in case of WiMAX) of a specific RAT. Parameter 'SecondaryAccessId' can be defined for a WLAN radio access network and can have a value that indicates HESSID (Homogeneous Extended Service Set ID) for example. In case that at least one PrioritizedAccess is available, a parameter 'AccessNetworkPriority' can have a value (e.g., having a higher priority if getting lower) corresponding to priority among them and may indicate that an access is restricted in case of a specific value (e.g., 254).

In Table 2, ValidityArea is a category that indicates an area condition for applying a specific rule. ValidityArea corresponds to a geometric area. If conditions of sub-elements are satisfied, the above-mentioned priority for PrioritizedAccess can be determined. In particular, if a UE moves into a location corresponding to sub-parameter(s) of the category 'ValidityArea, a priority of an available access can be determined by sub-parameter(s) of the category 'PrioritizedAccess'.

PLMN, TAC, LAC, GERAN_CI, UTRAN_CI and EUTRA_CI, which are sub-parameters of 3GPP_Location in the category ValidityArea, correspond to a PLMN code, a TA (Tracking Area) code, a LA (Location Area) code, a cell identification information of GERAN, a cell identification information of UTRAN, and a cell identification information of EUTRA (to each of which a specific 3GPP location for ISMP rules is applied), respectively. Moreover, HESSID, SSID and BSSID, which are sub-parameters of WLAN, correspond to HESSID, SSID and BSSID (Basic Service Set ID) (to each of which a specific 3GPP location for ISMP rules is applied), respectively.

In the category ValidityArea, a parameter 'Circular' of Geo_Location can indicate a geographical circular area to which a single ISMP rule is applied. AnchorLatitude, AnchorLongitude and Radius, which are sub-parameters of 'Circular' correspond to a latitude, an longitude and a radius of the circular area, respectively.

Various MO parameters shown in Table 2 are exemplary and a detailed meaning of each of the parameters can refer to the document 3GPP TS 24.312.

The present invention newly defines a policy additional to the ISMP and ISRP that are the policies provided by the existing ANDSF. Since the application condition (or start condition) of the policy proposed by the present invention is different from the condition previously defined in the ANDSF, it is added as a new entity in the ANDSF. This is named a non-3GPP handover policy (N3HP) in the present document. Yet, the scope of the present invention is non-limited by the name 'N3HP' but includes expressions as categories of various names.

For instance, a condition for applying the N3HP policy information proposed by the present invention can be defined as an execution of a CS call. In particular, the N3HP policy can be referred to when the CS call is executed. For instance, When the embodiment 1 or embodiment 2 is performed (e.g., the step 6a or step 6b of FIG. 2, the step 0a or step 0b of FIG. 3), a referred policy can be defined as N3HP.

The N3HP policy is defined to be referred to for various purposes. In order to apply the N3HP policy on a specific condition (or situation), a new element may be defined in the N3HP policy information. The specific condition may be defined as a case of a PS handover failed, a case of a CS call requested, and the like. And, an element, which means a corresponding situation, can be defined as an additional parameter for the N3HP policy information. For instance, the additional parameter may be defined as a name 'Event'. Yet, the scope of the present invention is non-limited by the parameter name called 'Event' but includes expressions of parameters of various names.

A parameter 'Event' can have one of values indicating various conditions such as a PS handover failed (PS HO failed), a CS call requested and the like. Such a parameter 'Event' can be defined as ANDSF policy information like Table 3 in the following.

TABLE 3

<X> / Event = { 3GPP PS HO failed, CS call requested, . . . }

Moreover, an element 'Event' may be defined as a sub-element of ValidityArea like Table 4 in the following.

TABLE 4

<X>/ValidityArea/<X> / Event = { 3GPP PS HO failed, CS call requested, . . . }

As mentioned in the foregoing description, one example of configuration of the N3HP policy information proposed by the present invention can be represented as Table 3 in the following.

TABLE 5

<X>/N3HP
<X>/N3HP/<X>
<X>/N3HP/<X>/RulePriority
<X>/N3HP/<X>/PrioritizedAccess
<X>/N3HP/<X>/PrioritizedAccess/<X>
<X>/N3HP/<X>/PrioritizedAccess/<X>/ AccessTechnology
<X>/N3HP/<X>/PrioritizedAccess/<X>/ AccessId
<X>/N3HP/<X>/PrioritizedAccess/<X>/ SecondaryAccessId
<X>/N3HP/<X>/PrioritizedAccess/<X>/ AccessNetworkPriority
<X>/N3HP/<X>/ValidityArea
<X>/N3HP/<X>/ValidityArea/3GPP_Location
<X>/N3HP/<X>/ValidityArea/3GPP_Location/<X>
<X>/N3HP/<X>/ValidityArea/3GPP_Location/<X>/PLMN
<X>/N3HP/<X>/ValidityArea/3GPP_Location/<X>/TAC
<X>/N3HP/<X>/ValidityArea/3GPP_Location/<X>/LAC
<X>/N3HP/<X>/ValidityArea/3GPP_Location/<X>/GERAN_CI
<X>/N3HP/<X>/ValidityArea/3GPP_Location/ <X>/UTRAN_CI
<X>/N3HP/<X>/ValidityArea/3GPP_Location/ <X>/EUTRA_CI
<X>/N3HP/<X>/ValidityArea/WLAN_Location
<X>/N3HP/<X>/ValidityArea/WLAN_Location/<X>
<X>/N3HP/<X>/ValidityArea/WLAN_Location/<X>/HESSID
<X>/N3HP/<X>/ValidityArea/WLAN_Location/<X>/SSID
<X>/N3HP/<X>/ValidityArea/WLAN_Location/<X>/BSSID
<X>/N3HP/<X>/ValidityArea/Geo_Location
<X>/N3HP/<X>/ValidityArea/Geo_Location/Circular
<X>/N3HP/<X>/ValidityArea/Geo_Location/Circular/<X>
<X>/N3HP/<X>/ValidityArea/Geo_Location/Circular/<X>/ AnchorLatitude
<X>/N3HP/<X>/ValidityArea/Geo_Location/Circular/<X>/ AnchorLongitude
<X>/N3HP/<X>/ValidityArea/Geo_Location/Circular/<X>/ Radius
<X>/N3HP/<X>/ValidityArea/Event
. . .

In the example of Table 5, a parameter '<X>/N3HP/<X>/PrioritizedAccess/<X>/AccessTechnology' can be defined as one of values indicating WiFi, HSPA, and the like. A parameter '<X>/N3HP/<X>/PrioritizedAccess/<X>/AccessId' can be set to a value (e.g., xxx) indicating a specific access. A parameter '<X>/N3HP/<X>/PrioritizedAccess/<X>/SecondaryAccessId' can be set to a value (e.g., yyy) indicating a specific access. A parameter '<X>/N3HP/<X>/PrioritizedAccess/<X>/AccessNetworkPriority' can be set to a value (e.g., zzz) indicating a priority of a specific access network. A parameter '<X>/N3HP/<X>/ValidityArea/3GPP_Location/<X>/EUTRA_CI' can be set to a value (e.g., aaa) indicating a cell identification information of EUTRA. A parameter '<X>/N3HP/<X>/ValidityArea/Event' can be set to a value indicating an event (e.g., 3GPP PS HO failed) corresponding to a condition for referring to the policy.

Hence, according to the example shown in Table 5, if a specific event (e.g., 3GPP PS HO failed) occurs at a location (e.g., 3GPP_Location, Geo_Location) determined by the category 'ValidityArea', it indicates a policy that a handover is performed by a specific access technology (e.g., WiFi) determined by the category 'PrioritizedAccess'. Particularly, in addition to a policy for a prioritized selection of a specific access at a specific location, the present invention clearly indicates that the N3HP policy is applied in case of an occurrence of a specific event.

Moreover, in order for a handover into a non-3GPP access to be selectively performed by APN unit or IP flow unit, the present invention proposes a new parameter added to ANDSF policy information.

For instance, in order for a handover into a non-3GPP access to be selectively performed by APN unit, a parameter indicating an APN group including at least one APN can be additionally defined in the ANDSF policy. For instance, an APN parameter can be added to an existing ISMP policy. Alternatively, an APN parameter can be added to the N3HP policy proposed by the present invention (cf. Table 6). Hence, a policy that APN(s) included in a corresponding APN group is handed over into a desired access (e.g., WiFi) can be defined or represented.

TABLE 6

<X>/N3HP/<X>/ForServiceBased/<X>/APN

For instance, in order for a handover into a non-3GPP access to be selectively performed by IP flow unit, a parameter indicating a specific IP flow can be additionally defined in the ANDSF policy. For instance, an IP flow parameter can be added to an existing ISMP policy. Alternatively, an IP flow parameter can be added to the N3HP policy proposed by the present invention (cf. Table 7). Hence, a policy, which indicates that a corresponding IP flow is handed over into a desired access (e.g., WiFi) and that the rest of IP flow(s) are excluded from the handover into the corresponding access, can be defined or represented.

TABLE 7

<X>/N3HP/<X>/ForFlowBased/<X>/IPFlow

The ANDSF policy information including the additionally proposed parameters can be configured as Table 8 in the following. Format of Table 8 may be understood as additional to the format of Table 5.

TABLE 8

. . .
<X>/N3HP/<X>/ForFlowBased
<X>/N3HP/<X>/ForFlowBased/<X>/
<X>/N3HP/<X>/ForFlowBased/<X>/IPFlow
<X>/N3HP/<X>/ForFlowBased/<X>/IPFlow/<X>/
<X>/N3HP/<X>/ForFlowBased/<X>/IPFlow/<X>/ AddressType
<X>/N3HP/<X>/ForFlowBased/<X>/IPFlow/<X>/ StartSourceIPaddress
<X>/N3HP/<X>/ForFlowBased/<X>/IPFlow/<X>/ EndSourceIPaddress
<X>/N3HP/<X>/ForFlowBased/<X>/IPFlow/<X>/ StartDestIPaddress
<X>/N3HP/<X>/ForFlowBased/<X>/IPFlow/<X>/ EndDestIPaddress TABLE 8-continued

```
<X>/N3HP/<X>/ForFlowBased/<X>/IPFlow/<X>/ ProtocolType
<X>/N3HP/<X>/ForFlowBased/<X>/IPFlow/<X>/
StartSourcePortNumber
<X>/N3HP/<X>/ForFlowBased/<X>/IPFlow/<X>/ EndSourcePortNumber
<X>/N3HP/<X>/ForFlowBased/<X>/IPFlow/<X>/ StartDestPortNumber
<X>/N3HP/<X>/ForFlowBased/<X>/IPFlow/<X>/ EndDestPortNumber
<X>/N3HP/<X>/ForFlowBased/<X>/IPFlow/<X>/QoS
<X>/N3HP/<X>/ForFlowBased/<X>/IPFlow/<X>/DomainName
<X>/N3HP/<X>/ForFlowBased/<X>/HandoverCriteria
<X>/N3HP/<X>/ForFlowBased/<X>/ HandoverCriteria /<X>/
<X>/N3HP/<X>/ForFlowBased/<X>/ HandoverCriteria /<X>/
ValidityArea
<X>/N3HP/<X>/ForFlowBased/<X>/ HandoverCriteria /<X>/
ValidityArea<X> / Event
<X>/N3HP/<X>/ForFlowBased/<X>/ HandoverCriteria /<X>/ TimeOfDay
<X>/N3HP/<X>/ForFlowBased/<X>/ HandoverCriteria /<X>/APN
<X>/N3HP/<X>/ForFlowBased/<X>/HandoverRule
<X>/N3HP/<X>/ForFlowBased/<X>/HandoverRule/<X>/
AccessTechnology
<X>/N3HP/<X>/ForFlowBased/<X>/RulePriority
<X>/N3HP/<X>/ForServiceBased
<X>/N3HP/<X>/ForServiceBased/<X>/
<X>/N3HP/<X>/ForServiceBased/<X>/APN
<X>/N3HP/<X>/ForServiceBased/<X>/ HandoverCriteria
<X>/N3HP/<X>/ForServiceBased/<X>/ HandoverCriteria /<X>/
<X>/N3HP/<X>/ForServiceBased/<X>/ HandoverCriteria /<X>/
ValidityArea
<X>/N3HP/<X>/ForServiceBased/<X>/ HandoverCriteria/<X>/
ValidityArea<X> / Event
<X>/N3HP/<X>/ForServiceBased/<X>/ HandoverCriteria /<X>/
TimeOfDay
<X>/N3HP/<X>/ForServiceBased/<X>/ HandoverRule
<X>/N3HP/<X>/ForServiceBased/<X>/ HandoverRule /<X>/
AccessTechnology
<X>/N3HP/<X>/ForServiceBased/<X>/RulePriority
. . .
```

According to the example shown in Table 8, a parameter '<X>/N3HP/<X>/ForFlowBased/<X>/IPFlow/<X>/QoS' among the elements under a parameter '<X>/N3HP/<X>/ForFlowBased/<X>/IPFlow' can be set to a value indicating QoS of a bearer unit. Hence, it is able to indicate a policy that N3HP is applied to bearer(s) that meets the corresponding QoS. Moreover, a parameter '<X>/N3HP/<X>/ForFlowBased/<X>/HandoverCriteria/<X>/ValidityArea<X>/Event' can be set to a value indicating an event (e.g., 3GPP PS HO failed) corresponding to a condition for referring to the policy. A parameter '<X>/N3HP/<X>/ForFlowBased/<X>/HandoverRule/<X>/AccessTechnology' can be set to a value indicating a specific access network (e.g., WiFi).

According to the example shown in Table 8, a parameter '<X>/N3HP/<X>/ForServiceBased/<X>/APN' among the elements under a parameter '<X>/N3HP/<X>/ForServiceBased' indicates that the policy is applied to APN(s) included in a corresponding APN group only. A parameter '<X>/N3HP/<X>/ForServiceBased/<X>/HandoverCriteria/<X>/ValidityArea<X>/Event' can be set to a value indicating an event (e.g., 3GPP PS HO failed) corresponding to a condition for referring to the policy. A parameter <X>/N3HP/<X>/ForServiceBased/<X>/HandoverRule <X>/AccessTechnology'can be set to a value indicating a specific access network (e.g., WiFi).

Hence, according to the example shown in Table 8, if a specific event occurs at a specific location, a handover is performed with a specific access technology. And, it is able to define and use a policy that such a PS handover is performed on an IP flow satisfying a specific condition (e.g., QoS, etc.) or an APN satisfying a specific condition (e.g., address, etc.) only.

According to the example shown in Table 8, ForFlowBased and sub-elements and ForServiceBased and sub-elements are defined under the N3HP category, by which the scope of the present invention is non-limited. Moreover, the above elements may be defined as new parameters in ISMP or ISRP. For instance, since a parameter '<X>/N3HP/<X>/ForFlowBased/<X>/HandoverCriteria/<X>/ValidityArea<X>/Event' or a parameter '<X>/N3HP/<X>/ForServiceBased/<X>/HandoverCriteria/<X>/ValidityArea<X>/Event' in Table 8 has a meaning of restricting an event condition for applying a non-3GPP handover per specific IP flow or specific APN, it can be defined as a sub-parameter of ISMP or ISRP as well as the N3HP category.

The N3HP policy proposed by the present invention includes a policy information that is used in determining a PS handover into a non-3GPP access (e.g., WiFi) if a PS handover into a 3GPP access is impossible. Although the present invention is described using N3HP that is a new policy name distinguished from an existing ISMP or ISRP for clarity, the N3HP policy proposed by the present invention can be defined in a manner of being combined with the existing ISMP or ISRP or as a policy subordinate to the existing ISMP or ISRP.

Embodiment 4

The present embodiment relates to a new operation method for a UE to determine a PS handover into a non-3GPP access network based on the aforementioned ANDSF policy information newly proposed by the present invention.

Based on the ANDSF policy (e.g., N3HP) defined as the embodiment 3, a UE can determine whether a combination of conditions (e.g., a case that a PS HO into a 3GPP access is impossible, a case that a priority of a non-3GPP access such as a WiFi access or the like is high, etc.) indicated by various parameters is satisfied. In this case, a target (e.g., a specific APN, a specific IP flow, etc.) of a PH handover into a non-3GPP access is determined and the PS handover can be then performed. For instance, as proposed by the embodiment 1 or the embodiment 2, the PS HO into the non-3GPP access can be performed in a target cell or a serving cell.

Moreover, a UE is in a position to update and maintain a latest state of a policy information. For instance, the UE can update the policy information in TAU/RAU. The update/maintenance of a new policy (e.g., N3HP policy) proposed by the present invention can be managed in combination with ISMP or ISRP or as a separate policy. To this end, the UE can perform a query/response operation for ANDSF. A policy (e.g., N3HP policy) provided by the ANDSF may include a preferred access information.

Regarding the configuration and use method of the policy information related to the aforementioned method of performing a PS service handover between a 3GPP access network (e.g., E-UTRA) and a non-3GPP access network (e.g., WiFi) [i.e., Embodiment 1, Embodiment 2, Embodiment 4] and/or the aforementioned PS handover into the non-3GPP access network, the items mentioned in the former descriptions of the various embodiments of the present invention are independently applicable or at least two of the embodiments can be simultaneously applied.

FIG. 4 is a diagram for one example of the configuration of a user equipment (UE) device and a network node device according to a preferred embodiment of the present invention.

Referring to FIG. 4, a user equipment device 1000 according to the present invention can include a transceiving module 1100, a processor 1200 and a memory 1300. The transceiving module 1100 can be configured to transmit various signals, data and informations to an external device and to receive various signals, data and informations from the external device. The user equipment device 1000 can be connected to the external device by wire and/or wireless. The processor 1200 can control overall operations of the user equipment device 1000 and can be configured to perform a function of operating information and the like to be transceived with the external device by the user equipment device 1000. The memory 1300 can store the operated information and the like for prescribed duration and may be substituted with such a component as a buffer (not shown in the drawing) and the like.

Referring to FIG. 4, a network node device 2000 according to the present invention can include a transceiving module 2100, a processor 2200 and a memory 2300. The transceiving module 2100 can be configured to transmit various signals, data and informations to an external device and to receive various signals, data and informations from the external device. The network node device 2000 can be connected to the external device by wire and/or wireless. The processor 2200 can control overall operations of the network node device 2000 and can be configured to perform a function of operating information and the like to be transceived with the external device by the network node device 2000. The memory 2300 can store the operated information and the like for prescribed duration and may be substituted with such a component as a buffer (not shown in the drawing) and the like.

The detailed configurations of the user equipment device 1000 and the network node device 2000 mentioned in the above description may be implemented in a manner that the matters of the various embodiments of the present invention mentioned in the foregoing description are independently applicable or that at least two of the various embodiments of the present invention are simultaneously applicable. And, duplicate contents may be omitted for clarity.

Embodiments of the present invention may be implemented using various means. For instance, embodiments of the present invention can be implemented using hardware, firmware, software and/or any combinations thereof.

In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. Therefore, the present invention is non-limited by the embodiments disclosed herein but intends to give a broadest scope matching the principles and new features disclosed herein.

INDUSTRIAL APPLICABILITY

The embodiments of the present invention mentioned in the foregoing description can apply to various kinds of mobile communication systems.

What is claimed is:

1. A method of performing a handover of a PS (packet switched) service in a user equipment of a wireless communication system, the method comprising:
   receiving a handover policy information from a network node; and
   determining whether to perform the handover of the PS service based on the handover policy information without suspending the PS service,
   wherein the handover policy information includes an information indicating an event for performing the handover of the PS service and a target access technology of the handover of the PS service,
   wherein the target access technology is set to a value indicating a non-3 GPP access technology,
   wherein the event is set to a value indicating a CS (circuit switched) call request, and
   wherein the determining whether to perform the handover of the PS service is performed before a CSFB (circuit switched fall back) is performed after occurrence of a request for a voice call.

2. The method of claim 1, wherein the non-3GPP access technology comprises WiFi.

3. The method of claim 1, wherein the handover policy information further comprises at least one selected from the group consisting of an access ID information, a secondary access ID information or an access network priority information.

4. The method of claim 1, wherein the handover policy information further comprises an information on a location of the user equipment at which the handover of the PS service is performed.

5. The method of claim 1, wherein the handover policy information further comprises an information on at least one of an IP (internet protocol) flow for performing the handover of the PS service or an APN (access point name) for performing the handover of the PS service.

6. The method of claim 1, wherein the determining whether to perform the handover of the PS service is performed if recognizing that the PS service is not supported by a target cell or a target RAT (radio access technology) into which the user equipment attempts to move.

7. The method of claim 1, wherein the handover policy information is provided together with ISMP (inter-system mobility policy) information or ISRP (inter-system routing policy) information.

8. The method of claim 1, wherein the handover policy information is received in response to a policy information request transmitted to the network node by the user equipment.

9. The method of claim 1, wherein the network node comprises ANDSF (access network discovery and selection function).

10. A user equipment for performing a handover of a PS (packet switched) service in a wireless communication system, the user equipment device comprising:
    a transceiving module; and
    a processor configured to:

receive a handover policy information from a network node using the transceiving module, determine whether to perform, before a CSFB (circuit switched fall back) is performed after occurrence of a request for a voice call, the handover of the PS service based on the handover policy information without suspending the PS service, wherein the handover policy information includes an information indicating an event for performing the handover of the PS service and a target access technology of the handover of the PS service, wherein the target access technology is set to a value indicating a non-3GPP access technology, and wherein the event is set to a value indicating a CS (circuit switched) call requested.

* * * * *